(12) United States Patent
Kench et al.

(10) Patent No.: US 11,308,719 B2
(45) Date of Patent: *Apr. 19, 2022

(54) SYSTEM AND METHOD FOR CAPTURE AND DISTRIBUTION OF INFORMATION COLLECTED FROM SIGNS

(71) Applicant: QUALCOMM Incorporated, San Diego, CA (US)

(72) Inventors: Amol Kench, San Diego, CA (US); Gautam Nirula, Santa Clara, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/894,507

(22) Filed: Jun. 5, 2020

(65) Prior Publication Data

US 2020/0302197 A1 Sep. 24, 2020

Related U.S. Application Data

(63) Continuation of application No. 15/971,859, filed on May 4, 2018, now Pat. No. 10,699,140.

(51) Int. Cl.
*G06T 7/00* (2017.01)
*G06V 20/58* (2022.01)
(Continued)

(52) U.S. Cl.
CPC ........ *G06V 20/582* (2022.01); *G06F 16/5846* (2019.01); *G06K 9/6267* (2013.01);
(Continued)

(58) Field of Classification Search
CPC .. G06K 9/00818; G06K 9/344; G06K 9/6267; G06K 9/0671; G06K 9/0476;
(Continued)

(56) References Cited

U.S. PATENT DOCUMENTS 8,131,118 B1 3/2012 Jing et al.
8,600,102 B1 12/2013 Frome
(Continued)

OTHER PUBLICATIONS

International Search Report and Written Opinion—PCT/US2019/030573—ISA/EPO—dated Sep. 26, 2019.
(Continued)

*Primary Examiner* — Jose L Couso
(74) *Attorney, Agent, or Firm* — Thien T. Nguyen

(57) ABSTRACT

Disclosed is a method and apparatus for capturing, collecting, and distributing event information displayed on signs. The method may include capturing, by a mobile device, an image of a sign that displays information for an event. The method may also include extracting information for the event from the captured image of the sign, and determining a location of the mobile device when the image of the sign was captured. Furthermore, the method may include uploading, to a server, a time when the image was captured, the information for the event extracted from the captured image, a location of the event determined from extracted event information, a location of the sign, or a combination thereof.

26 Claims, 4 Drawing Sheets

(51) Int. Cl.
*G06T 7/70* (2017.01)
*G06F 16/583* (2019.01)
*G06K 9/62* (2022.01)
*H04W 4/021* (2018.01)
*G06V 30/148* (2022.01)
*G06V 30/10* (2022.01)

(52) U.S. Cl.
CPC .............. *G06T 7/70* (2017.01); *G06V 30/153* (2022.01); *H04W 4/021* (2013.01); *G06V 30/10* (2022.01)

(58) Field of Classification Search
CPC ............. G06K 9/0063; G06K 9/00664; G06K 9/00791; G06K 9/00805; G06K 9/3241; G06K 9/46; G06K 9/4671; G06K 9/228; G06K 9/00288; G06K 9/00536; G06K 9/18; G06K 9/22; G06K 9/325; G06K 9/3258; G06K 9/6201; G06K 9/726; G06K 9/78; G06K 9/6292; G06K 9/00711; G06K 9/00771; G06K 9/00778; G06K 2209/01; G06K 2009/00738; G06T 7/70; G06T 7/11; G06T 7/10; G06T 7/194; G06T 7/33; G06T 7/337; G06T 7/73; G06T 7/00; G06T 7/13; G06T 7/246; G06T 11/60; G06T 19/003; G06T 19/00; G06T 13/40; G06T 17/05; G06T 2207/10016; G06T 2207/30232; G06T 2207/10024; G06F 16/5846; G06F 16/583; G06F 16/58; G06F 16/5866; G06F 16/29; G06F 16/60; G06F 16/434; G06F 16/587; G06F 16/955; G06F 16/951; G06F 16/5854; G06F 3/04815; G06F 3/0484; G06F 3/04883; G06F 19/00; G06F 19/328; G06F 2201/86; H04W 4/021; H04W 4/02; H04W 4/029; H04W 4/023; H04W 4/024; H04W 4/40; H04W 4/50; H04N 7/181; H04N 7/183; H04N 7/185; H04N 21/23109; H04N 21/23418; H04N 2201/23418; H04N 2201/3253; H04N 2201/3254; H04N 2201/3274; G01C 21/3602; G01C 21/20; G01C 21/30; G01C 21/26; G06Q 10/02; G06Q 10/1095; G06Q 30/0201; G06Q 30/02; G06Q 30/0241; G06Q 30/0217; G06Q 30/0267; G06Q 30/0623; G06Q 30/0266; G06Q 30/0601; B60R 2300/70; B60R 2300/302; B60R 2300/308; B60R 2300/80; B60R 2300/8053; G08G 1/0112; G08G 1/0129; G08G 1/0133; G08G 1/0141; G08G 1/091; G08G 1/096716; G08G 1/096741; H04L 67/18; A63F 13/216; A63F 13/65; A63F 13/213; A63F 2300/205; A63F 2300/1087; A63F 2300/69

See application file for complete search history.

(56) References Cited

U.S. PATENT DOCUMENTS

| | | | |
|---|---|---|---|
| 9,055,384 | B2 | 6/2015 | Ivanchenko et al. |
| 9,076,045 | B2 | 7/2015 | Atsmon et al. |
| 9,128,959 | B2 | 9/2015 | Barrington et al. |
| 9,430,944 | B2 | 8/2016 | Grimm et al. |
| 9,824,481 | B2 | 11/2017 | Naguib et al. |
| 10,218,941 | B1 | 2/2019 | Park et al. |
| 10,699,140 | B2 | 6/2020 | Kench et al. |
| 11,103,773 | B2* | 8/2021 | Rathod .............. G06Q 30/0601 |
| 2006/0240862 | A1 | 10/2006 | Neven et al. |
| 2008/0317346 | A1 | 12/2008 | Taub |
| 2010/0094878 | A1* | 4/2010 | Soroca ................... G06Q 30/02 707/748 |
| 2010/0331043 | A1 | 12/2010 | Chapman et al. |
| 2011/0093328 | A1 | 4/2011 | Woolcott |
| 2011/0211760 | A1 | 9/2011 | Boncyk et al. |
| 2012/0230538 | A1 | 9/2012 | Calman et al. |
| 2013/0026241 | A1* | 1/2013 | Sakahashi ........ G06K 19/06037 235/494 |
| 2013/0101163 | A1 | 4/2013 | Gupta et al. |
| 2013/0254035 | A1* | 9/2013 | Ramer ............... G06Q 30/0256 705/14.62 |
| 2013/0260795 | A1 | 10/2013 | Papakipos et al. |
| 2014/0289323 | A1 | 9/2014 | Kutaragi et al. |
| 2014/0301645 | A1 | 10/2014 | Mattila |
| 2014/0344062 | A1 | 11/2014 | Lamont |
| 2015/0161474 | A1 | 6/2015 | Jaber et al. |
| 2016/0104121 | A1 | 4/2016 | Garner |
| 2016/0351051 | A1 | 12/2016 | Murthy et al. |
| 2017/0004374 | A1 | 1/2017 | Osindero |
| 2017/0222962 | A1* | 8/2017 | Gauglitz ............ G06Q 30/0267 |
| 2017/0343372 | A1 | 11/2017 | Vandanapu et al. |
| 2018/0089869 | A1 | 3/2018 | Bostick et al. |
| 2018/0246983 | A1* | 8/2018 | Rathod .............. G06F 16/9535 |
| 2018/0300761 | A1 | 10/2018 | Pittman |
| 2018/0350144 | A1 | 12/2018 | Rathod |
| 2019/0043241 | A1* | 2/2019 | Scheff ..................... H04L 67/10 |
| 2019/0050904 | A1 | 2/2019 | Wasserman et al. |
| 2019/0122046 | A1 | 4/2019 | Wantland et al. |
| 2019/0289260 | A1 | 9/2019 | Park et al. |
| 2019/0303807 | A1* | 10/2019 | Gueye ................... G06Q 10/02 |
| 2019/0340449 | A1 | 11/2019 | Kench et al. |
| 2021/0133810 | A1* | 5/2021 | Macneille .......... G06Q 30/0241 |

OTHER PUBLICATIONS

Partial International Search Report—PCT/US2019/030573—ISA/EPO—dated Jul. 31, 2019.

* cited by examiner

SYSTEM AND METHOD FOR CAPTURE AND DISTRIBUTION OF INFORMATION COLLECTED FROM SIGNS

RELATED APPLICATIONS

This application is a continuation of U.S. application Ser. No. 15/971,859, filed May 4, 2018, entitled "SYSTEM AND METHOD FOR CAPTURE AND DISTRIBUTION OF INFORMATION COLLECTED FROM SIGNS", which is assigned to the assignee hereof, and incorporated by reference herein in its entirety.

FIELD

The subject matter disclosed herein relates generally to the capture and distribution of event information displayed on ephemeral and non-ephemeral signs.

BACKGROUND

Social networking systems, microblogging systems, bulletin board systems, etc. have developed as important sources for distributing information. These systems, which require user generation of content, are not adept at distributing information for locally advertised events, such as event advertisements listed on signs (e.g., signboards, sandwich boards, fliers, posters, etc.) at real world locations and for which the subject event or advertisement may only be ongoing for a limited time period. For example, a signboard placed on a street corner may display information relating to a real estate listing at a specific address for a specific date and time, a yard sale poster may be placed at a stoplight and simply have a graphic that points down a street with the words "Yard Sale", a sign held by a person may advertise a sale at a nearby store by listing the name of the store and pointing at the stores location, as well as other advertisements for local and limited time events.

The above described example signs are typically ephemeral, in that they are placed and removed from their real world locations after a couple of hours, a day, or some other time period. Furthermore, there may be no other record of the event for which the signs advertise, except through the sign's own content. When there is a record of the event advertised by the sign, such as a real estate open house corresponding to a sign, a user would be required to manually search through web pages, real estate listings, real estate agent company listings, etc., enter query data, and otherwise search for the advertised listing's details. Such actions distract users from their current task at hand, such as driving, which may potentially be very dangerous. In addition to the safety considerations with distributing the advertised event's details, potentially interested parties may not even know of an advertised event unless they are proximate to and physically view the sign. Furthermore, even if there were a way to distribute information concerning the event, sign-based event advertisements are often incomplete regarding significant event details. For example, a sign may fail to display an event's address, a duration of the event, whether an event is still occurring, etc.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
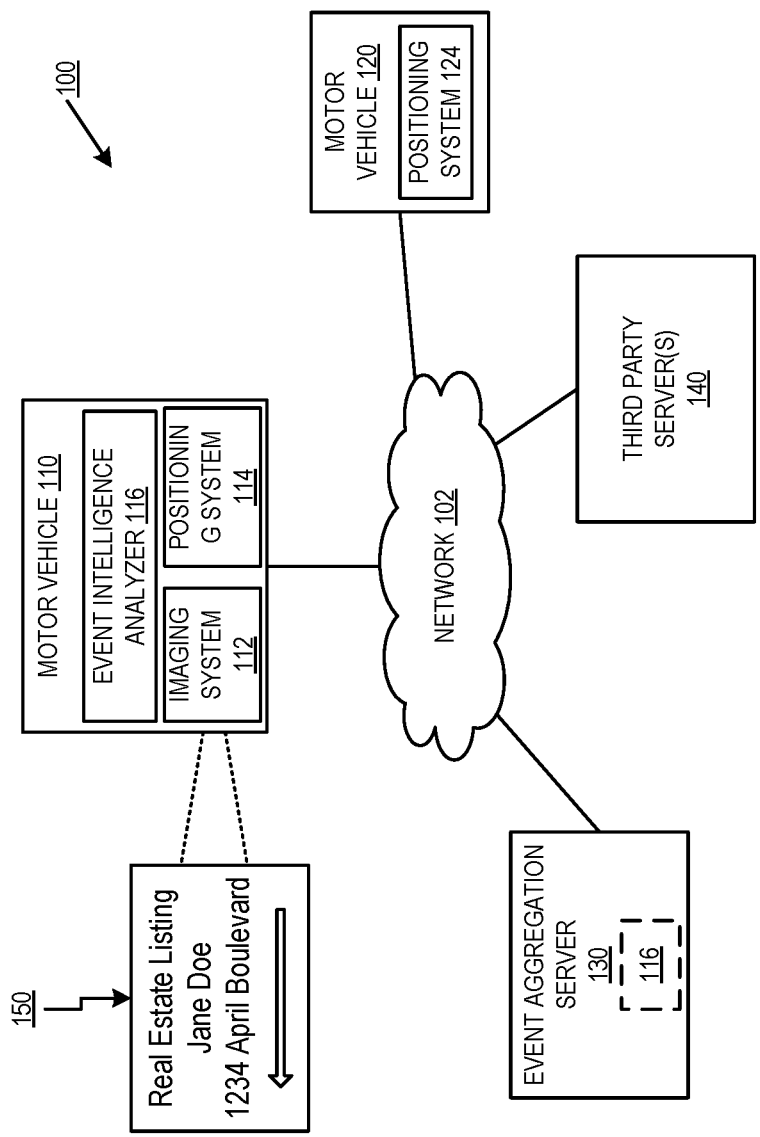
FIG. 1 is a block diagram of an exemplary system architecture for capturing, collecting, and distributing event information displayed on signs.

FIG. 1 is a block diagram of an exemplary system architecture 100 for capturing, collecting, and distributing event information displayed on signs. In one embodiment, a motor vehicle 110 includes an imaging system 112 (e.g., one or more cameras, RADAR, LIDAR, image analysis processor, etc.) and a positioning system 114 (e.g., GNSS system, such as a global positioning system (GPS)). In embodiments, the imaging system 112 and positioning system 114 may be used by motor vehicle 110 to perform autonomous driving, semi-autonomous driving, or other driver assistance functions. Motor vehicle 110 utilizes imaging system 112 to capture an image of an event advertisement sign 150, such as a sign, poster, signboard, sandwich board, etc. placed on a street corner, attached to a traffic light, held by a person, etc. For example, sign 150 illustrates a real estate advertisement signboard typically placed on a street corner with event information providing the purpose of the sign (e.g., a listing for real estate), the listing agent (e.g., Jane Doe), an address associated with a listed property (e.g., 1234 April Boulevard), and a directional indicator relative to the sign's 150 real world location. Other signs with more or less information concerning an advertised event, may also be captured by motor vehicle 110 consistent with the discussion herein.

In one embodiment, imaging system 112 provides captured image data to event intelligence analyzer 116, which extracts one or more event information elements from the sign by performing image analysis on the captured sign's image. In embodiments, the image analysis performed by event intelligence analyzer 116 can include applying one or more machine learning model trained image classifiers to the captured image of the sign to extract and recognize, for example, event information elements such as the listing agent's name, a company associated with the sign, a logo displayed on the sign, determine that the directional indicator is present on the sign, etc. Furthermore, the positioning system 114 may determine a real world location of the motor vehicle 110 when an image of the sign 150 was captured in order to associate the determined real world location of motor vehicle 110 with the image of the sign, and thus the extracted information. Similarly, timing information associated with when the image was captured may be associated by event intelligence analyzer 116 with the extracted information.

In one embodiment, event intelligence analyzer 116 may further process one or more of the extracted event information elements to better define the element, such as coordinating the determined location with the directional indicator to predict a real world location of an event. For example, motor vehicle's 110 determined position and heading are $(x_0, y_0, z_0)$ and true-North, and thus the extracted directional indicator of the sign may indicate that the location of the even advertised by sign 150 is at $(x_1, y_1, z_1)$ plus or minus a predefined confidence interval. In another example, the extracted sign's purpose (e.g., real estate listing) and the extracted address and/or listing agent's name, may be used by event intelligence analyzer 116 to obtain data not listed on the sign. Event intelligence analyzer 116 may query a third party server 140, such as a multiple listing server (MLS) databased system, based on the address and/or listing agent's name to complete information associated with the sign, such as price of a house associated with the real estate listing, time of the event, etc. Event intelligence analyzer 116 may further infer one or more additional event information elements, for example, based on the time associated with the capture of image data of the sign 150. For example, based on the time of day, and information extracted from the sign (e.g., sign's purpose), event intelligence analyzer 116 can infer whether an event is still ongoing, how long the event may last, etc. Such inferences may be based on one more machine learning processes performed by event intelligence analyzer 116 (e.g., learning that yard sales typically end by 3 PM on Sundays), based on searches of third party server(s) 140 for hours defined for an event (e.g., a store's hours are 8 AM to 10 PM), based on social norms (e.g., a lunch special will only be valid during typical lunch hours of 11 AM to 2 PM), based on data associated with known categories (e.g., real estate open houses are typically only on the day in which a sign is first seen, and for a limited time), etc.

In embodiments, event intelligence analyzer 116 of motor vehicle 110 communicates the data associated with and extracted from the captured image of the sign, such as the estimated location of the sign, a categorization of the sign's type, an estimated location of an event advertised in the sign including an optional confidence interval, a time of the image capture, various information elements extracted from the sign's content (e.g., addresses, time, directional indicators, business names, individual names, words of event description, etc.), as well as information learned based on the extracted information (e.g., by querying one or more third party server(s) 140), to event aggregation server 130.

In one embodiment, event aggregation server 130 is a remote computer processing system that may receive event information elements extracted by event intelligence analyzer 116 of motor vehicle 110 from image data (e.g., the data generated by motor vehicle 110 from the image, GNSS data associated with sign 150, and information learned by querying third party system(s) 140). Event intelligence analyzer 116 of server 130 may also receive one or more of image, time, and location data from motor vehicle 110, and perform its own event information extraction using an event intelligence analyzer 116. In yet another embodiment, event intelligence analyzers 116 of server 130 and motor vehicle 110 may cooperatively perform event information extraction, such as by applying different image analysis classifier to a captured image of sign 150. In one embodiment, event aggregation server 130 may receive image data captured of sign 150, time data when the image was captured, and location data associated with motor vehicle 110 where the image was captured. In this embodiment, event aggregation server 130 uses its own event intelligence analyzer 116 to extract the various event information elements discussed above. In another embodiment, both motor vehicle 110 and event aggregation server 130 may both attempt to extract the same information elements, different event information elements, or refine information associated with the same information element. For example, event intelligence analyzer 116 of motor vehicle may infer, based on its own analysis that an event's duration should not last longer than 3 PM. However, information elements extracted for the event by other image data captured by the same or other motor vehicles, and in some embodiments from different signs at different locations for the same event, may be used by event intelligence analyzer 116 of event aggregation server 130 to refine event information elements (e.g., event duration confidence, location approximation, etc.)

In the embodiments, event aggregation server 130 then maps extracted sign information elements to a real world location to build an event profile associated with the sign 150 in an events profile database. In embodiments, the event profiles database maintained by event aggregation server 130 includes a unique record for each determined event, and each of the information elements associated with the event. For example, event aggregation server 130 stores a record of the first instance associated with the capture and extraction of event details from sign 150. Then, when a new instance of event details (e.g., subsequently uploaded to or extracted by server 130) is received for sign 150, for example from a second motor vehicle (not shown) that also captured an image and extracts information associated with sign 150, a new record of the event is not created by event aggregation server 130. Instead, any additional information received from subsequent image capture and event information extraction may be integrated into the existing record by event aggregation server 130 to further refine, expand, or update the event's profile. For example, if timing information is not available for an event (e.g., is not extractable from the sign, not available from querying a third party server 140, cannot be inferred from a societal or business norm, etc.), the event may be given a default duration (e.g., 2 hours from creation of the event profile). Then, when a new capture of the sign is uploaded to event aggregation server 130 from a second motor vehicle, event aggregation server may extend the event's duration, for example by a predefined amount of time such as extending the event's duration by an additional 1 hour. Furthermore, multiple captures of the same and/or different signs for the same event may be utilized by event aggregation server 130 to adjust and/or maintain an event's information elements. For example, one or more confidence values, such as confidence associated with an event's inferred duration, freshness of event information elements, etc. can be adjusted as new instances of the same event are detected, or no additional instance of the event are detected. Other techniques may be utilized by the event aggregation server 130 to complete and maintain an event's information details in an associated event profile record. For example, event aggregation server 130 may query one or more wireless network traffic indication services to determine a number of concurrent unique wireless network accesses relative to the location of the event. When the number of concurrent unique accesses exceeds a threshold, the event may be determined to still be ongoing, and the event's duration in the event profile can be extended. Various techniques for determining event duration, such as receipt of multiple instances of the metadata associated with image captured of sign 150, searching for event duration on one or more third party server(s) 140, performing access density analysis for wireless network access points proximate to an event, enabling event organizers to set event durations at event aggregation server, edit event durations, end events, based on crowdsourced application data (e.g., social media check-ins at an event, photographic uploads of an event), based on crowd sourced navigation data (e.g., based on a number of navigation services used to the same location), etc., may be used by even aggregation server 130.

Furthermore, event aggregation server 130 may apply its own image analysis (e.g., machine learning based event classifiers) to extract additional event details and/or verify the received information associated with sign 150. For example, event aggregation server 130 may apply a different image classifier to recognize logos displayed on sign 150, may apply optical character recognition to the sign and then apply a text analysis classifier to extract information elements, as well as other image analysis techniques. Furthermore, event aggregation server 130 may use the received and/or extracted information to query additional third party server(s) 140, such as using a logo as the basis for an image based search of a business associated with the sign 150.

In embodiments, in addition to preventing duplicate event records of the same event in an event profiles database, and optionally contributing additional information to event records, event aggregation server 130 further establishes a boundary around the event. For example, the boundary may be a geofence established around the determined location of the event. As discussed in greater detail herein, the geofence may be maintained around the event for the duration of the event, so that additional motor vehicles and/or user devices, such as motor vehicle 120 with a positioning system 124 can be informed of relevant events based on the timeliness of the event, proximity of motor vehicle 120 to the event, and relevance of the event to a user. Furthermore, different boundary dimensions may be used for different types of events. For example, a boundary having a first set of dimensions may be established around a non-commercial event (e.g., a boundary with a ¼ mile radius is established around a garage sale), whereas a boundary having a second set of dimensions is established around commercial events (e.g., a boundary having a 1 mile radius is established around a restaurant with a lunch special).

In one embodiment, the event aggregation server 130 may use boundaries to merge and/or maintain a distinction between different events. For example, two boundaries may be set around the same real world location, or may be set at different real world locations but intersect one another. For example, if there are more than one event at the same location, such as a plant sale and a car wash, the events may be separated and different boundaries maintained by event aggregation server 130 based on the differences in the type of event. If, however, it is determined by event aggregation server 130 that the events are the same, such as a multi-part event having the same name, events having the same address, etc., the different boundaries and events may be merged.

In one embodiment, event aggregation server 130 is further responsible for establishing user profiles associated with the users of various user devices (e.g., motor vehicle 110 and 120). For example, event aggregation server 130 generates user profiles by receiving from a user a specification of event categories for which notifications should be provided (e.g., real estate, home wares sales, restaurants, etc.). In embodiments, a user may establish, update, and maintain a user profile at event aggregation server 130 via an interface of motor vehicle, mobile device (e.g., mobile telephone), or other computing device. Event aggregation server 130 may additionally receive details or characteristics associated with each category specified by user, such as a geographic area of interest (e.g., a neighborhood or city for real estate, a company selling home wares, a type of cuisine, a time at which notifications should be received, etc.), subjects of interest (e.g., real estate, restaurant, retail, garage sales, etc.), a time associated with various interests (e.g., real estate events on weekends, restaurant events between 5 PM and 8 PM, etc.), event characteristics (e.g., real estate listings in a certain price range, type of foods offered by restaurants, neighborhoods having garage sales, etc.), as well as other information. The event notification categories and notification characteristics are then used by event aggregation server 130 to maintain user profile records for distribution of relevant event notifications to users.

In one embodiment, after a user establishes a user profile with event aggregation server 130, the user's mobile device (e.g., motor vehicle 120) then receives relevant event notifications based on, for example, the motor vehicle's reported location, one or more event characteristics in the user's profile, and whether an event is still active. Therefore, the event notifications are relevant to a user's interests, timely relative to an event's duration, and relevant to a user's current location. For example, motor vehicle 120 may report its location as determined by location system 124 to event aggregation server 130. Then, based on the motor vehicle's 130 current location and a user profile associated with the user of vehicle 120, ongoing events in an event's profile data store can be queried based on the user's profile, location, and time. When a relevant event is found, event aggregation server 130 further determines whether the event is still ongoing and whether the motor vehicle's current location is within a predefined boundary surrounding the event (e.g., has the user breached a geofence associated with an event). A relevant, local, and timely event notification may then be sent to motor vehicle 120, including information relevant to the event (e.g., location, event details, time of event, geographic coordinates associated with the event, a confidence that the event is still ongoing, etc.). The motor vehicle 120 may then act on the notification, such as navigating to the event. For autonomous vehicles, the event notification may be used to re-route the vehicle to automatically navigate to the event by configuring a navigation system based on the received event details. For semi-autonomous or non-autonomous vehicles, the event notification may be used to configure a navigation system the can prompt the user with directions to the event.

Beneficially, motor vehicle 120 may receive event information details for events listed by sign 150, which are not actually witnessed by an imaging system (not shown) of motor vehicle 120 or a user of motor vehicle 120. In fact, motor vehicle 120 may not come into any visual contact with sign 150, but may be alerted to the event advertised by the sign based on various characteristics predefined by the user (e.g., real estate listings around location X, for single family homes below the price of Y). Not only is such an event notification beneficial to the user of motor vehicle 120, but it is also beneficial to event organizers by opening up the event to a wider range of interested parties.

Although motor vehicles are discussed above (e.g., motor vehicle 110 and 120), the event information capture, detail extraction, and notification can be carried out by any combination of mobile entities, such as mobile telephones, smart glasses, wearable devices, drone systems, motor vehicles, or other mobile devices and systems that are capable of performing the image capture, image analysis, and positing functions discussed herein. In the embodiments discussed herein, motor vehicles, mobile entities, mobile devices, mobile systems, etc. are interchangeable when referring to the systems that can be used to execute the processes and techniques discussed herein.

Figure 2:
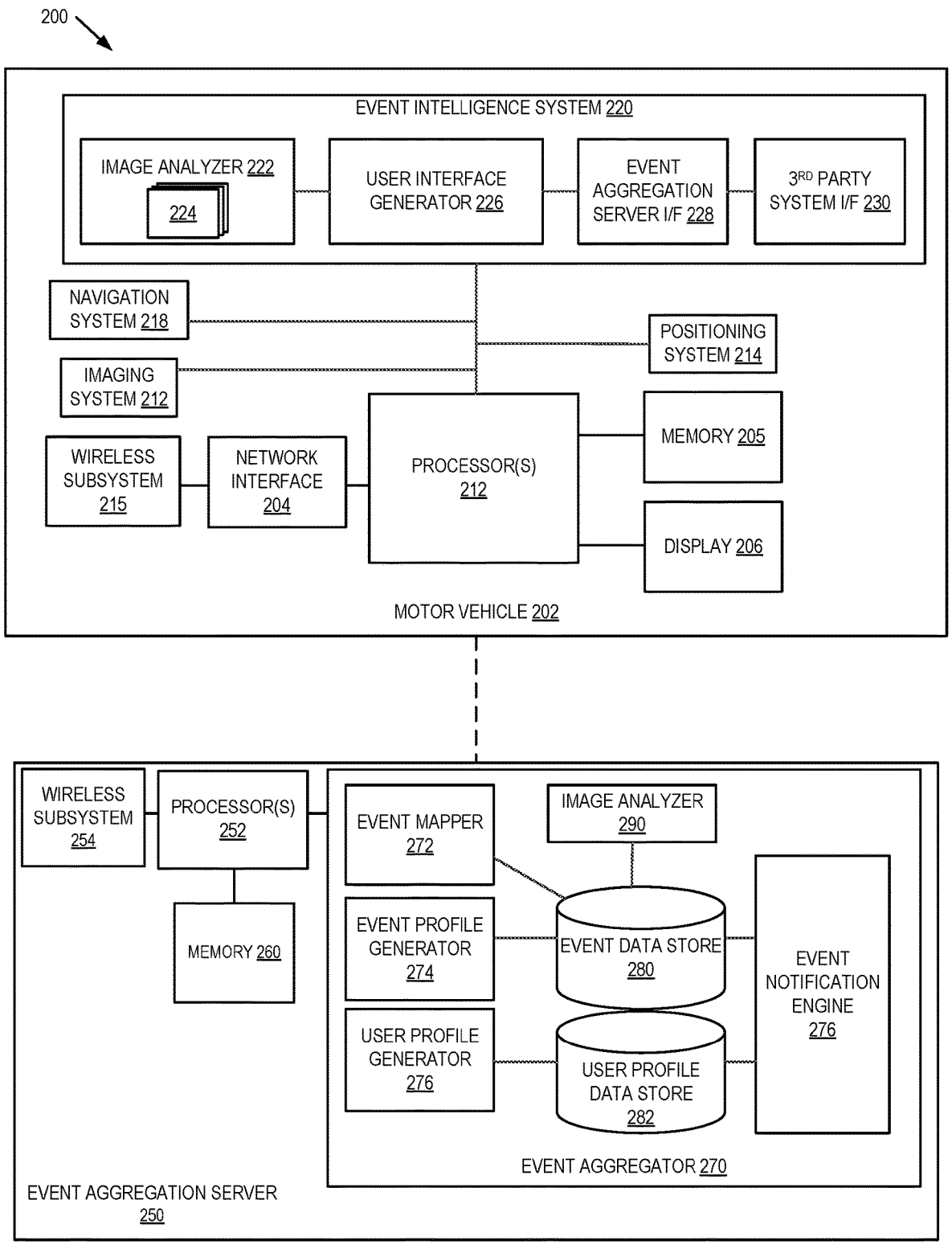
FIG. 2 is block diagram of one embodiment of a system including a motor vehicle and an event aggregation server.

FIG. 2 is block diagram of one embodiment of a system 200 including a motor vehicle and an event aggregation server. Motor vehicle 202 and event aggregation server provide additional details for motor vehicle 110 and event aggregation server 130 discussed above in FIG. 1.

In one embodiment, motor vehicle 202 is a system, which may include one or more processor(s) 212, a memory 205, a network interface 204, a wireless subsystem 205, a display 206, a navigation system 218, and an imaging system 212. It should be appreciated that motor vehicle 202 may also include, although not illustrated, one or more user and/or hardware interfaces, one or more power device(s) (e.g., vehicle battery, autonomous drive control system, etc.), a propulsion system (e.g. an electric, gasoline, etc. powered motor), a steering system, a braking system, as well as other components typically associated with motor vehicles. Although only a single wireless subsystem 215 is illustrated, it is understood that network interface 204 may be capable of communicatively coupling autonomous vehicle 202 to any number of wireless subsystems (e.g., Bluetooth, Wi-Fi, Cellular, or other networks) to transmit and receive data streams through a wireless link to/from event aggregation server 250.

In one embodiment, event aggregation server 250 is also a system, which may include one or more processor(s) 252, memory 260, and wireless subsystem 254. It should be appreciated that event aggregation server 250 may also include, although not illustrated, a user interface (e.g., keyboard, touch-screen, or similar devices), a power device (e.g., a battery), a display screen (e.g., an LCD display), as well as other components typically associated with computer processing systems.

In embodiments, the memories (e.g., memory 205 and memory 260) of motor vehicle 202 and event aggregation server 250 may be coupled to processor(s) to store instructions for execution by the processors, such as processor(s) 212 and processor(s) 252. In some embodiments, the memory is non-transitory, and may store one or more processing modules. In one embodiment, memory 205 of motor vehicle 202 may store one or more processing modules of event intelligence system 220, such as image analyzer 222, user interface generator 226, event aggregation server interface (I/F) 228, $3^{rd}$ party system I/F 230 to implement embodiments described herein. Furthermore, memory 260 of event aggregation server 250 may also include an event aggregator 270 including an event mapper 272, event profile generator 274, user profile generator 276, image analyzer 290, and event notification engine 276.

It should be appreciated that the embodiments as will be hereinafter described may be implemented through the execution of instructions, for example as stored in memory or other element, by processor(s) and/or other circuitry of motor vehicle 202 and event aggregation server 250. Particularly, circuitry of motor vehicle 202 and event aggregation server 250, including but not limited to processor(s) 212 and processor(s) 252 may operate under the control of a program, routine, or the execution of instructions to execute methods or processes in accordance with the aspects and features described herein. For example, such a program may be implemented in firmware or software (e.g. stored in memory 205 and/or memory 260) and may be implemented by processors, such as processor(s) 212 and processor(s) 252, and/or other circuitry. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines, or modules described herein may be performed by motor vehicle 202 itself and/or some or all of the functions, engines or modules described herein may be performed by another system connected through network interface 204 to motor vehicle 202. Thus, some and/or all of the functions may be performed by another system, and the results or intermediate calculations may be transferred back to motor vehicle 202. In some embodiments, such other device may comprise a server, such as event aggregation server 250 and/or another server (not shown).

In one embodiment, motor vehicle 202 includes an imaging system 212, which can include one or more cameras for capturing images of the environment surrounding motor vehicle 202. For example, one or more cameras of imaging system 212 may capture images of objects surrounding motor vehicle 202 as motor vehicle travels between real world locations. Motor vehicle also includes a positioning system 214, such as a GNSS based positioning system that determines a current real world location of the motor vehicle, in real time, as the motor vehicle 202 travels between real world locations. Both the captured images and location information are continuously or periodically provided to event intelligence system 220.

Event intelligence system 220 includes image analyzer 222. Image analyzer 222 is responsible for determining and extracting various informational characteristics about signs, such as ephemeral signboards discussed in greater detail above, that are depicted within the images captured by imaging system 212. In embodiments, image analyzer 222 accesses one or more classifiers 224, for example by accessing the classifiers when stored in memory 205). Each classifier may be a machine learning trained image analysis classifier that extracts data from visual objects within the captured images, and performs one or more recognition operations for determining the content and/or meaning associated with the extracted data. For example, one of the classifiers 224 may include a text recognition classier trained to recognize various types of written data (e.g., handwritten, mechanically reproduced, etc.). As another example, one of the classifiers 224 may include an image recognition classifier trained to recognize business logos. As yet another example, one of the classifiers 224 may include an image recognition classier trained to recognize directional indicators (e.g., arrows, line, and other markings) and, as discussed in greater detail herein, infer a real world location of an event from the directional indicator and the location of the motor vehicle when the image was captured. As yet another example, one of the classifiers 224 may associate various extracted content with an inferred purpose or meaning for the sing's content, such as distinguishing between real estate signs (e.g., when real estate logos are recognized, MLS listing IDs are found, etc.), retail store signs (e.g., based on content advertising "sale"), restaurant signs (e.g., with content indicative of food, or food related content such as "Happy Hour!"). As yet another example, limiters associated with the sign may also be extracted by one or more classifiers to recognize explicitly stated event duration (e.g., "3-4 only!") and based on societal norms (e.g., "Happy Hour!" specials typically run from 4 PM to 6 PM). Classifiers 224 may include any number of classifiers for extracting and recognizing the content that may potentially be depicted in images captured of signs. In embodiments, the extracted information is information to be associated with an event for which the sign is advertising, such as a real estate listing, a commercial sale, a restaurant special, a yard sale, or any other type of event advertised by an ephemeral sign. Furthermore, in embodiments, the location of the event and the location of the sign may be different (e.g., the event may be at a first real world location a distance away from the sign placed at a second real world location).

In one embodiment, one or more of the extracted informational characteristics extracted from a sign, such as textual content, graphical content, etc. is provided to $3^{rd}$ party system I/F 230. $3^{rd}$ party system I/F 230 utilizes the extracted information to query one or more $3^{rd}$ party systems for additional information relevant to an event advertised by a sign. For example, real estate systems (e.g., MLS listing server, commercial real estate company, etc.) may be queried when the information extracted from a sign are indicative of a real estate event, such as utilizing an extracted real estate agent name from a sign to query an MLS listing service for listings associated with the agent's name. As another example, a merchant's website may be queried when information extracted from a sign indicates that the merchant is hosting an event at one of their real world stores. Any obtained $3^{rd}$ party system information is provided by $3^{rd}$ party system I/F 230 to image analyzer 222.

Image analyzer 222 then transmits event information obtained from the motor vehicle's captured images of signs, using event aggregation server I/F 228, to the event aggregation server 250. In one embodiment, the information sent by image analyzer 222 includes the extracted event information elements and associated meanings of those elements, any additional $3^{rd}$ party system event information elements, a location of the motor vehicle where an image of a sign was captured, and a time when the image was captured (e.g., the sign was observed by motor vehicle 202). Additional information, such as the captured image itself, any inferences generated by image analyzer (e.g., an inferred societal norm, a predicted location based on the motor vehicles location and a directional indicator, etc.), an identifier associated with the motor vehicle 202 or a user of the motor vehicle 202, may also be transmitted to the event aggregation server 250.

Event aggregator 270 of event aggregation server 250 receives the data from motor vehicle 202 for generating and/or refining an event profile associated with the event advertised by the ephemeral sign. In one embodiment, for the first instance of a captured image of a sign for an event, as determined from sign content, event information, inferred sign location, etc., event profile generator 274 generates a uniquely identified event profile in event data store 280. That is, event profile generator 274 creates a single event profile for each event for which sign information is captured, regardless of whether different motor vehicles capture information from the same event sign or whether different signs for the same event are captured. Furthermore, the various event informational elements received from motor vehicle (e.g., inferred event location, title of event, event type, recited duration if any, etc.) are stored in the record containing the event profile.

In one embodiment, event aggregator 270 also includes an image analyzer 290 (e.g., similar to image analyzer 222) that may perform its own image analysis using the same or different classifiers. For example, image analyzer 290 may apply more computationally intensive image classifiers than those employed by image analyzer 222, so that event aggregation server 270 can perform different or additional image information extraction that may not be feasible on the more limited computational resources of the motor vehicle. In another embodiment, however, event aggregation server 250 may only receive an image from motor vehicle 202, a location of motor vehicle 202 when the image was captured, and a time when the image was captured. In this embodiment, image analyzer 290 may perform the sign information extraction discussed above. In yet another embodiment, event aggregator 270 does not employ its own image analyzer when received event information is sufficient to create an event profile (e.g., contains a certain subset of data, such as duration, title, event type, etc.).

In any of the embodiments discussed above, event mapper 272 of event aggregator 270 maps a real world location (e.g., address, coordinates, etc.) to an event profile. The real world location may be a location inferred from event intelligence analyzer 220 of motor vehicle 202 (e.g., based on the motor vehicles position and a sign's directional indicator, based on a $3^{rd}$ party system's listing for an event as determined by a 3rd party query performed by motor vehicle, etc.), as well as based on a location determination of event aggregator 270. In embodiments, the mapped real world location enables the event profile for the event to be associated with the actual location of the event, even when the sign (e.g., from which the event information was extracted) is not located proximate or near the actual event. Furthermore, the mapping of the event to a real world location enables event profile generator 274 to avoid creating duplicate event profile records (e.g., records for the same event) from information extracted from signs at different locations, but which advertise the same event. Finally, the mapping and the event information elements enable event profile generator 274 to maintain different events for the same real world location (e.g., a restaurant with a "Taco Tuesday" event which is active all day on Tuesday, and a "Happy Hour" event that is active Monday through Thursday from 4 PM to 6 PM). In one embodiment, the mapping of a real world location to an event further enables event profile generator 274 to establish one or more boundaries around an event, such as geofence(s) discussed above, to be associated with an event in the event's profile.

In one embodiment, event profile generator 274 further infers an event duration or active status for each event maintained in event data store 280. As discussed herein, the event duration can be inferred from the content of the sign, the capture of images of sign(s) for the same event at different time by the same and/or different motor vehicles, based on information obtained from $3^{rd}$ party systems, etc. Furthermore, as discussed herein, wireless network access point information can be queried by event profile generator 274 to infer an event is still active based on a number of devices that access a wireless network within a predefined area surrounding an event. Other information may also influence an event's duration, such as assigning an event a default duration when other sources are unable to provide an even duration, and extending the event's default duration each time a successive image of an event sign is captured.

Event aggregator server 250, as discussed above, maintains unique event profiles for events advertised by ephemeral and non-ephemeral signs. Furthermore, the event profiles are updated and maintained by event aggregation server 250 in real time so that the event information obtainable by event signs is current and fresh. Additionally, event information captured by the same or multiple users can inform event aggregator server 250 as to the same or different event details, as well as confirming or extending event durations.

In one embodiment, event aggregator 270 further maintains a user profile data store 282. User profile generator 276 may interact with user interface generator 226 of motor vehicle 202 in the creation of a user profile. Other devices, such as a user's mobile telephone, personal computer, tablet, etc. may also be used to establish a user profile maintained by event aggregation server. User profile generator 276 establishes a user profile for a user including various interests, notification preferences, geographical regions, etc. For example, a user profile could specify an interest in real estate listings, a real estate type (e.g., condo, house, commercial property, etc.), a price range for listings the user is interested in, a specific neighborhood, etc. As another example, a user may specify an interest in restaurant specials, their preferred cuisine types, level of discount (e.g., buy one get one, 10% off or greater, etc.), time of day (dinner specials, breakfast specials on weekends, etc.), etc.

In one embodiment, event aggregation server I/F 228 of motor vehicle 202 periodically sends event notification engine 276 of event aggregation server 250 a current location of the motor vehicle 202. The current location is a location determined by positioning system 212. In one embodiment, positioning system 214 can generate the motor vehicles current position 202 specifically for reporting to the event notification engine 276. In another embodiment, positions determined while motor vehicle is performing another function (e.g. navigation using navigation system 218) may also be transmitted to even notification engine 276.

In one embodiment, a user identifier (e.g., an identifier associated with the user's profile in user profile data store 282) is also transmitted with the current location of the motor vehicle. Event notification engine 276 utilizes the user identifier to access a user profile, and determine based on user interests specified in the user profile, if the motor vehicle's current location is within a geofence of any relevant event. When event notification engine 276 determines that the motor vehicle has breached a geofence to a relevant event (e.g., one in which user profile attributes match event profile attributes), and a duration of the event indicates that the event is still active, event notification engine 276 sends a notification to moto vehicle. In embodiments, the event notification includes one or more of the relevant attributes about the event, such as event category, location, estimated duration, distance to event, etc.

User interface generator 226 of event intelligence system generates a user interface based on the received event notification, and displays the user interface using display 206. The user interface can include user selectable elements to, for example, request additional event information, program navigation system 218 with an event's location, etc. Thus, the display generated by user interface generator 226 enables a user to browse event notifications, and select to navigate to an event. For example, in an autonomous vehicle, an event notification can automatically or with permission of a user drive a user to a location where an event is occurring.

As discussed herein, event notifications are generated for motor vehicle 202 based on the motor vehicle's 202 current location, attributes associated with an event, and a profile of a user of the motor vehicle 202. That is, the user and/or motor vehicle need not see a sign advertising the event in order to receive the event notification. Beneficially, users of motor vehicles can be informed of events for which they might be interested regardless of whether they see an event notification or the event itself. Furthermore, the event details may be sourced from a plurality of different motor vehicle capturing images from the same or different event signs, applying the same or different image analysis classifiers, etc. so that a single robust, accurate, and current profile of the event can be created and maintained. Furthermore, duration information can be updated using subsequent sign image capture, wireless network usage statistics, etc. to ensure that events are still active, so that event notifications generated by event aggregator are still relevant.

Figure 3:
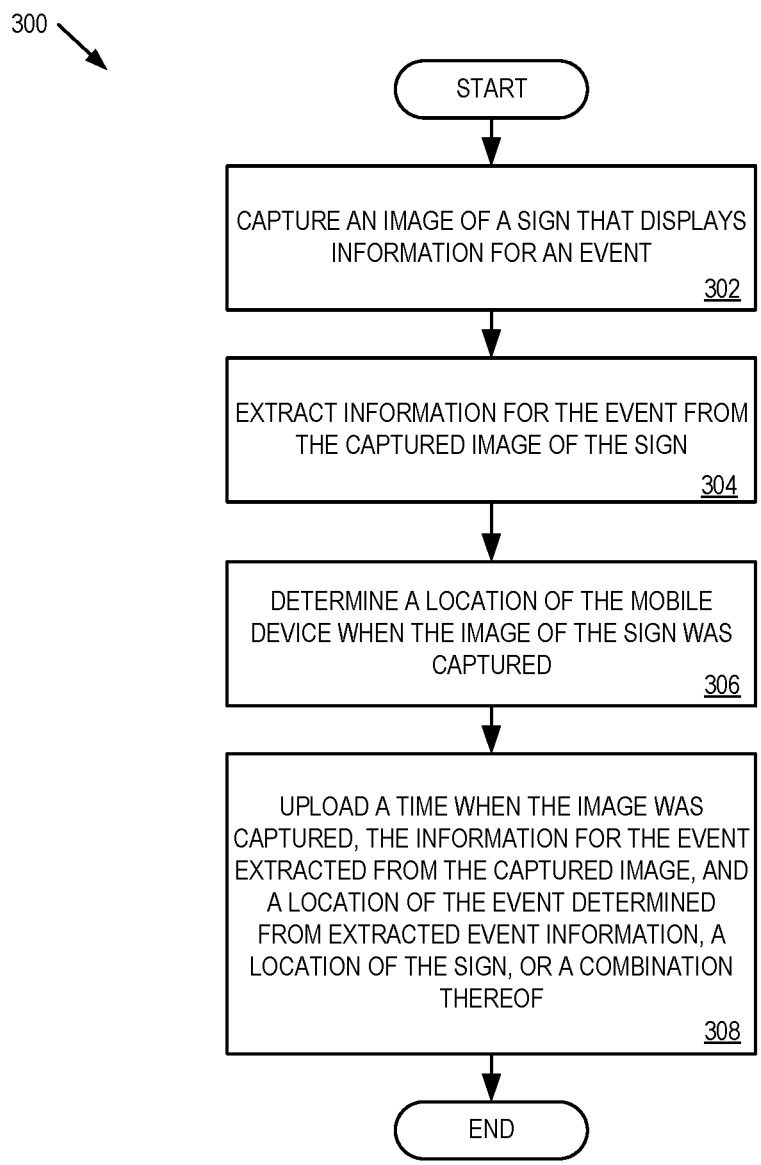
FIG. 3 is a flow diagram of one embodiment of a method for capturing, collecting, and distributing event information.

FIG. 3 is a flow diagram of one embodiment of a method 300 for capturing, collecting, and distributing event information displayed on sign. The method 300 is performed by processing logic that may comprise hardware (circuitry, dedicated logic, etc.), software (such as is run on a general purpose computer system or a dedicated machine), firmware, or a combination. In one embodiment, the method 300 is performed by a mobile device (e.g., motor vehicle 102 or 202).

Referring to FIG. 3, processing logic begins by capturing, by the mobile device, an image of a sign that displays information for an event (processing block 302). As discussed herein, processing logic captures images of the objects surrounding mobile device, such as while a motor vehicle travels between real world locations. However, other systems, such as smart glasses, mobile telephones, wearable devices with imaging capabilities, etc., may also capture images of objects during use. Furthermore, the images are captured by an imaging system of the mobile device, such as one or more cameras, a RADAR system, a LIDAR system, etc.

Processing logic then extracts information for the event from the captured image of the sign (processing block 304). In one embodiment, processing logic may apply one or more trained machine learning image analysis classifiers to the captured image data to extract various informational attributes from the sign depicted in the image data, and which describe the event. For example, the classifiers can extract information from the sign's content depicted in the captured image, such as textual information indicating names associated with an event, a company associated with an event, a category of an event (e.g., real estate, restaurant, garage sale, etc.) etc. As another example, a classifier may extract and analyze an image of a sign, such as corporate logos. As yet another example, directional indicators such as arrows indicative a location relative to a sign where an event is located, may also be extracted from an image of a sign. As another example, the information extracted from one or more classifiers can ingested by other classifiers to infer additional information for an event, such as inferring one or more societal norms or contextual meanings from extracted textual content (e.g., "happy hour" refers to a restaurant/bar event usually occurring from 4 PM to 6 PM, a "garage sale" category of signs usually refers to an event happing on a weekend from 8 AM to 3 PM, a "lunch special" sign refers to a time period surrounding 12 noon, etc.).

Processing logic then determines a location of the mobile device when the image of the sign was captured (processing block 306). As discussed herein, the location of the mobile device may be obtained using a GNNS based positioning system of the mobile device. Processing logic then uploads, to an event aggregation server, (i) a time when the image was captured, (ii) the information for the event extracted from the captured image, and (iii) a location of the event determined from extracted event information, a location of the signboard, or a combination thereof (processing block 308). The information uploaded to the event aggregation server may include additional information, such as the captured image itself to enable the event aggregation server to perform its own image analysis, as discussed herein. Furthermore, as discussed herein, the uploading of the information extracted from the sign, the location, and the time, enable event profiles to be created, maintained, updated, and distributed to and from a number of different mobile devices.

Figure 4:
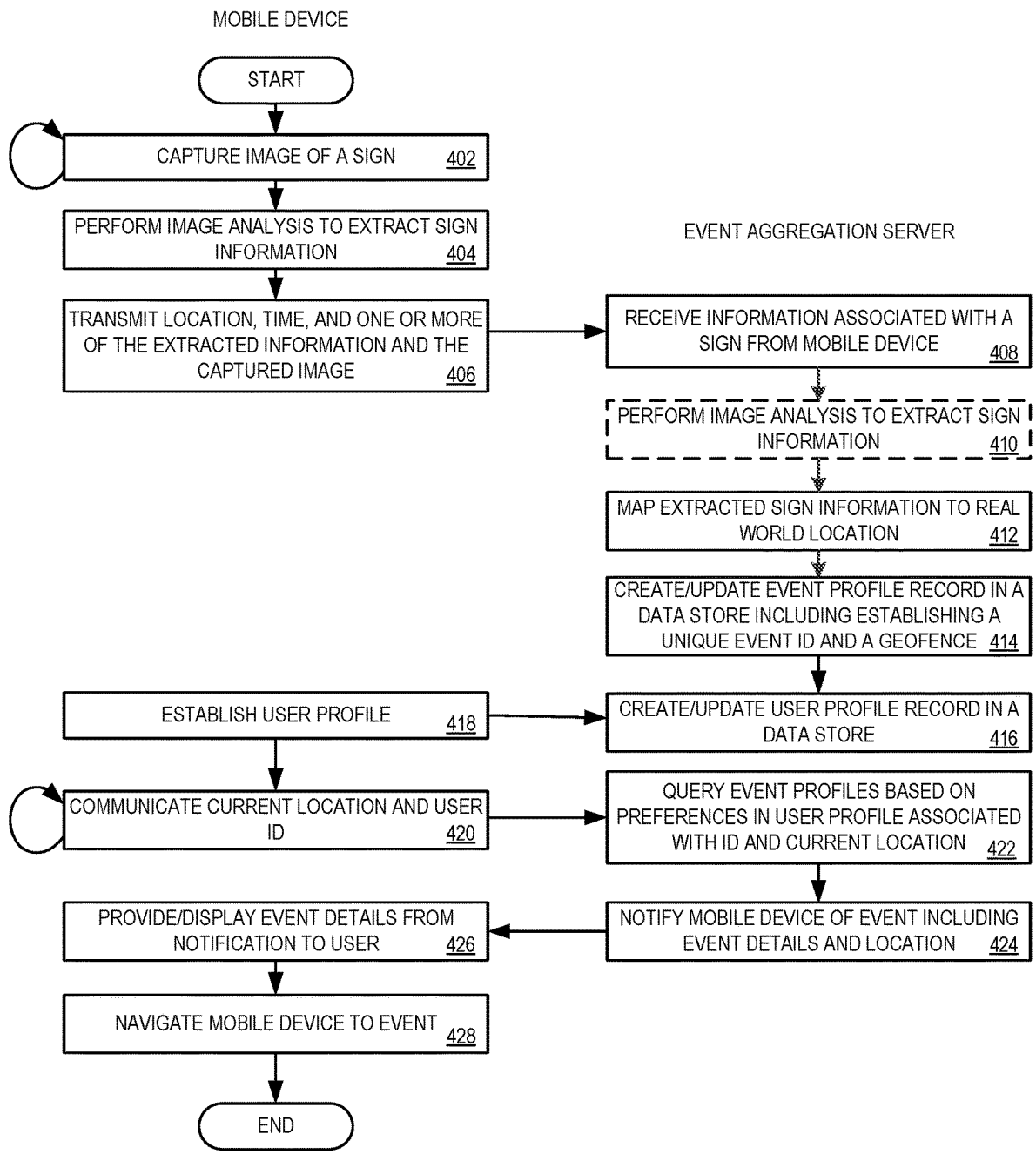
FIG. 4 is a flow diagram of one embodiment of a method for capturing, collecting, and distributing event information with a mobile device and an event aggregation server.

FIG. 4 is a flow diagram of one embodiment of a method 400 for capturing, collecting, and distributing event information displayed on sign. The method 400 is performed by processing logic that may comprise hardware (circuitry, dedicated logic, etc.), software (such as is run on a general purpose computer system or a dedicated machine), firmware, or a combination. In one embodiment, the method 400 is performed by a system, such as the system 100 or 200 having a mobile device (e.g., motor vehicle 102 or 202) and an event aggregation server (e.g., event aggregation server 130 or 250).

Referring to FIG. 4, processing logic of the mobile device begins by capturing an image of a sign (processing block 402). In embodiments, images are captured continuously or periodically by the mobile device. For example, where mobile device is a motor vehicle, a forward facing camera used by the motor vehicle for navigation purposes may continuously capture images as the motor vehicle navigates between real world locations. The images capture the environment outside of the motor vehicle, and may include the capture of one or more signs (e.g., temporary and non-temporary signs advertising various types of events). As discussed herein, processing logic performs an image analysis on the captured image(s) to extract sign information (processing block 404). For example, processing logic can apply one or more machine learning trained image analysis classifier to extract and/or infer a number of informational attributes about the event being advertised in the sign, such as event type, event location, duration of event, etc. Processing logic then transmits a location of the mobile device where the image was captured, a time when the mobile device captured the image, and one or more of the extracted information elements and the captured image to an event aggregation server (processing block 406).

Processing logic of the event aggregation server receives the information associated with a sign from the mobile device (e.g., the time, the location, the extracted information and/or the image) (processing block 408). The processing logic of the event aggregation server may then optionally perform its own analysis to extract sign information (processing block 410). In embodiments, processing logic of the event aggregation server performs image analysis to determine additional information associated with an event being advertised by a sign, to apply different image analysis classifiers, to find missing information, to confirm information provided by mobile device, to expand the information provided by the mobile device, to determine event information when only an image is provided by processing logic, etc.

Processing logic of the event aggregation server then maps the extracted sign information to a real world location (processing block 412). As discussed herein, the mapping can be based upon the sign's own content (e.g., an extracted address), as a result of querying a third party system (e.g., using a real estate agent's name, a restaurant's name, an inferred location, etc. to $3^{rd}$ party listing, corporate or directory service), by inference (e.g., based upon the mobile device's location when an image was captured and a directional indicator), etc. Furthermore, in embodiments, an interface may be provided by event aggregation server (not shown) that enables event organizers to add, revise, and update information associated with their events, such as setting an event active status, event duration, as well as other factors associated with an event. Processing logic utilizes the extracted information and the mapped location to create/update an event profile record in a data store (processing block 414). As discussed herein, the event profile is unique to each event, and thus processing logic assigns a unique event identifier to the event in the data store. Furthermore, additional information from the mobile device, as well as from other mobile device attributable to the event, is added to the unique event profile record (e.g., multiple records are not established for the same event).

Processing logic of the mobile device further establishes a user profile with the event aggregation server (processing block 418), which event aggregation server uses to create/update a user profile in a data store (processing block 416). In embodiments, a user of the mobile device may set up the profile on an interface of the mobile device, such as by selecting various event notification preferences (e.g., event type, times of notifications, characteristics of an event, etc.). The profile may be associated with a user, so that even if an operator of a motor vehicle changes, event notifications subsequently sent to the motor vehicle will be relevant to the vehicle's current operator.

Processing logic of the mobile device then periodically communicates a current location and a user ID to the event aggregation server (processing block 420). The processing logic of the event aggregation server uses the user ID to query an event profile associated with the user based on the user's current location (processing block 422). This query enables processing logic of the event aggregation server to determine when an event is currently ongoing for which the user may be interested (e.g., overlap of profile interest attributes with event attributes), and for which the user is a threshold distance from the event (e.g., within a geofence established around the event). The event located by the event aggregation server, however, is not necessarily an event for which the mobile device is currently, or has ever, seen an event sign. That is, the user of mobile device may be notified of relevant and ongoing events that have been sourced by other users, but for which the user of mobile device is near.

When the conditions for a notification are satisfied, processing logic of the event aggregation server notifies the mobile device of the event including event details and a location of the event (processing block 424). The processing logic of the mobile device then provides or displays one or more of the event details from the notification to the user (processing block 426). In embodiments, different subsets of the event details provided by event aggregation server may be provided to user. For example, an initial notification may provide or display a first set of details, such as an event category, host of an event, etc. Then, upon a user request for additional information, processing logic provides or displays additional information, such as distance from the event, duration of the event, reviews from $3^{rd}$ party review systems associated with the event, etc.

In one embodiment, the notification sent by event aggregation server at processing block 424 included the location of the event. In one embodiment, processing logic of the mobile device may utilize this location to navigate a user to the event (processing block 428). For example, where mobile device is an autonomous motor vehicle, the event location may be used by the autonomous motor vehicle to automatically reroute the vehicle to the event, upon a user selection to do so. As another example, a turn by turn navigation system may be programmed using the location in the notification to prompt a user with directions to the event.

It should be appreciated that the devices (e.g., motor vehicles, autonomous motor vehicles, cellular phones, server computer systems, etc.) discussed herein may communicate via one or more wireless communication links through a wireless network that are based on or otherwise support any suitable wireless communication technology. For example, one or more of the devices may associate with a network including a wireless network. In some aspects the network may comprise a local area network or a wide area network. Furthermore, the devices vehicle may support or otherwise use one or more of a variety of wireless communication technologies, protocols, or standards such as, for example, CDMA, TDMA, OFDM, OFDMA, WiMAX, and Wi-Fi.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the methods, systems, and apparatus of the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for capturing, collecting, and distributing event information displayed on signs, the method comprising:
   receiving, from a mobile device, information associated with a sign including details for an event occurring at a real-world location;
   creating an event profile record for the event, wherein the event profile record comprises:
      an event identifier,
      a duration of the event based at least in part on the information associated with the sign,
      a geofence defining a boundary surrounding the real-world location, and
      data indicative of the event based at least in part from the information associated with the sign; and
   storing the event profile record in an events profile database.

2. The method of claim 1, wherein the information associated with the sign comprises an image of the sign.

3. The method of claim 2, further comprising extracting at least a portion of the data indicative of the event from the image of the sign.

4. The method of claim 1, wherein the information associated with the sign comprises information extracted from an image of the sign by the mobile device.

5. The method of claim 1, further comprising mapping the information associated with the sign to the real-world location.

6. The method of claim 1, further comprising updating the event profile record based on information received from an event organizer.

7. The method of claim 1, further comprising:
determining an event type associated with the event; and
determining the geofence based at least in part on the event type.

8. The method of claim 1, further comprising:
sending a query to a server based at least in part on the information associated with a sign; and
receiving, from the server, information responsive to the query;
wherein the data indicative of the event is based at least in part on the information responsive to the query.

9. A device for capturing, collecting, and distributing event information displayed on signs, the device comprising:
a memory; and
one or more processors communicatively coupled with the memory and configured to:
receive, from a mobile device, information associated with a sign including details for an event occurring at a real-world location;
create an event profile record for the event, wherein the event profile record comprises:
an event identifier,
a duration of the event based at least in part on the information associated with the sign,
a geofence defining a boundary surrounding the real-world location, and
data indicative of the event based at least in part from the information associated with the sign; and
store, in the memory, the event profile record in an events profile database.

10. The device of claim 9, wherein, to receive the information associated with the sign, the one or more processors are configured to receive an image of the sign.

11. The device of claim 10, wherein the one or more processors are configured to extract at least a portion of the data indicative of the event from the image of the sign.

12. The device of claim 9, wherein, to receive the information associated with the sign, the one or more processors are configured to receive information extracted from an image of the sign by the mobile device.

13. The device of claim 9, wherein the one or more processors are configured to map the information associated with the sign to the real-world location.

14. The device of claim 9, wherein the one or more processors are configured to update the event profile record based on information received from an event organizer.

15. The device of claim 9, wherein the one or more processors are configured to:
determine an event type associated with the event; and
determine the geofence based at least in part on the event type.

16. The device of claim 9, wherein the one or more processors are configured to:
send a query to a server based at least in part on the information associated with a sign; and
receive, from the server, information responsive to the query; and
base the data indicative of the event at least in part on the information responsive to the query.

17. A method for distribution of event information displayed on signs, the method comprising:
establishing a user profile comprising one or more interests of a user of a mobile device;
receiving, from the mobile device, information indicative of a current location of the mobile device;
querying event profiles based on the current location of the mobile device and the one or more interests of the user in the user profile, wherein the event profiles comprise information for events obtained from images of signs for the events captured by one or more other mobile devices; and
sending, to the mobile device, an event notification for an event, wherein the event notification is based, at least in part, on:
the current location of the mobile device,
the one or more interests of the user in the user profile, and
a duration associated with the event indicating that the event is active.

18. The method of claim 17, wherein sending the event notification is further based on a determination that the current location of the mobile device is within a geofence associated with the event.

19. The method of claim 17, wherein the event notification comprises information indicative of a location of the event, a time of the event, geographic coordinates associated with the event, or a confidence that the event is still ongoing, or any combination thereof.

20. The method of claim 19, further comprising estimating the location of the event and the time of the event based, at least in part, on a time and a location of a second mobile device when an image of a sign comprising information for the event was captured by the second mobile device.

21. The method of claim 17, wherein establishing the user profile is responsive to receiving information indicative of the one or more interests from the mobile device.

22. A device for distribution of event information displayed on signs, the device comprising:
a memory; and
one or more processors communicatively coupled with the memory and configured to:
establish a user profile comprising one or more interests of a user of a mobile device;
receive, from the mobile device, information indicative of a current location of the mobile device;
query event profiles based on the current location of the mobile device and the one or more interests of the user in the user profile, wherein the event profiles comprise information for events obtained from images of signs for the events captured by one or more other mobile devices; and
send, to the mobile device, an event notification for an event, wherein the event notification is based, at least in part, on:
the current location of the mobile device,
the one or more interests of the user in the user profile, and
a duration associated with the event indicating that the event is active.

23. The device of claim 22, wherein the one or more processors are configured to send the event notification responsive to a determination that the current location of the mobile device is within a geofence associated with the event.

24. The device of claim 22, wherein the one or more processors are configured to include, in the event notification, information indicative of a location of the event, a time of the event, geographic coordinates associated with the event, or a confidence that the event is still ongoing, or any combination thereof.

25. The device of claim 24, wherein the one or more processors are configured to estimate the location of the event and the time of the event based, at least in part, on a time and a location of a second mobile device when an image of a sign comprising information for the event was captured by the second mobile device.

26. The device of claim 22, wherein the one or more processors are configured to establish the user profile responsive to receiving information indicative of the one or more interests from the mobile device.

\* \* \* \* \*